United States Patent
Oobayashi et al.

(10) Patent No.: US 6,780,506 B2
(45) Date of Patent: Aug. 24, 2004

(54) FIBER-REINFORCED POLYOLEFIN RESIN COMPOSITE AND MOLDED ARTICLE OBTAINED FROM THE SAME

(75) Inventors: Yoshiaki Oobayashi, Ichihara (JP); Katsuhisa Kitano, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/421,815

(22) Filed: Apr. 24, 2003

(65) Prior Publication Data

US 2004/0005448 A1 Jan. 8, 2004

(30) Foreign Application Priority Data

Apr. 26, 2002 (JP) ........................................ 2002-126181
Nov. 11, 2002 (JP) ........................................ 2002-326590

(51) Int. Cl.$^7$ ................................................. D02G 3/00
(52) U.S. Cl. .................. 428/401; 428/220; 428/232; 264/299; 264/319; 264/320; 525/191; 525/197
(58) Field of Search ................................. 428/220, 232, 428/401; 264/294, 299, 319, 320; 525/191, 197, 240

(56) References Cited

U.S. PATENT DOCUMENTS 6,300,415 B1 * 10/2001 Okayama et al. ........... 525/191

FOREIGN PATENT DOCUMENTS

JP         3-121146 A      5/1991

* cited by examiner

*Primary Examiner*—Merrick Dixon
(74) *Attorney, Agent, or Firm*—Sughrue Mion, PLLC

(57) ABSTRACT

Disclosed is a fiber-reinforced polyolefin resin composite containing a polyolefin resin (components (A)), fibers (component (B)) and a heavy metal deactivator (component (C)), the ratio of the weight of component (A) to the weight of component (B), (component (A)/component (B)), being from 20/80 to 95/5, the ratio of the weight of component (C) to the combined weight of component (A) and component (B), (component (C)/[component (A)+component (B)]), being from 0.001/100 to 5/100, wherein in the composite substantially all the component (B) have lengths of 2 mm or more. The composite has an improved durability under circumstances of contact with metal. A molded article obtained from the composite is also disclosed.

7 Claims, No Drawings

FIBER-REINFORCED POLYOLEFIN RESIN COMPOSITE AND MOLDED ARTICLE OBTAINED FROM THE SAME

BACKGROUND OF THE INVENTION

1. Field of the Invention

The present invention relates to a fiber-reinforced polyolefin resin composite and to a molded article obtained from the same. In particular, this present invention relates to a fiber-reinforced polyolefin resin composite having an improved durability under circumstances of contact with metal and a molded article obtained from the composite.

2. Description of the Related Art

Polyolefin resin is in wide use as a general purpose resin because it is excellent in moldability and chemical resistance and has a low specific gravity. However, it is not always satisfactory in respect of mechanical strength and heat resistance and hence is rather restricted in its use. As a means for ameliorating such shortcomings and improving the mechanical strength of polyolefin resin such as rigidity and impact strength, it is already known to incorporate fillers, fiber, or the like into the resin. In industrial practice, fiber-reinforced polyolefin resin composites have been produced by mixing short fibers, such as chopped strands, with polyolefin resin and granulating the mixture with a kneader, but their mechanical strengths have not yet been fully satisfactory.

Accordingly, some attempts have been made to increase the mechanical strength greatly by using fiber of large fiber length. JP-A-3-121146 discloses a method for producing a long-fiber-reinforced polyolefin resin composite using a pultrusion process, the method comprising a step of impregnating continuous fiber strands with molten polyolefin resin while the fiber strands are being pulled, thereby incorporating, into the resin, 5–80% by weight (based on the total weight) of fibers arranged substantially in parallel each other. Mechanical properties, e.g. rigidity and impact strength, were improved by formed articles of long fiber-reinforced polyolefin resin composites produced by using such pultrusion molding methods.

Up to now, polyolefin resin has a problem that when it is applied to uses in which it contacts directly with metal, it becomes susceptible to thermal oxidative degradation, resulting in lowered durability. Long-fiber-reinforced polyolefin resin composites also have the same problem and, even when using conventional techniques which have been applied for formed articles of short-fiber-reinforced polyolefin resin composites produced by melt kneading, enhancement in durability under circumstances of contact with metal is still insufficient. Therefore, further improvement has been eagerly awaited.

SUMMARY OF THE INVENTION

An object of the present invention is to provide a fiber-reinforced polyolefin resin composite having an improved durability under circumstances of contact with metal and a molded article obtained from the composite.

After extensive study, the present inventors found that the above problems can be solved by a fiber-reinforced polyolefin resin composite and a molded article obtained from the same, the composite comprising a polyolefin resin (component (A)), fibers (component (B)), and a heavy metal deactivator (component (C)), the ratio of the weight of component (A) to the weight of component (B), (component (A)/component (B)), being within a specific range, the ratio of the weight of component (C) to the combined weight of components (A) and (B), (component (C)/[component (A)+component (B)]), being within a specific range, wherein in the composite substantially all the component (B) have lengths within a specific range. Resultantly, they completed the present invention.

That is, the present invention provides a fiber-reinforced polyolefin resin composite comprising the following components (A), (B) and (C), the ratio of the weight of component (A) to the weight of component (B), (component (A)/component (B)) being from 20/80 to 95/5, the ratio of the weight of component (C) to the combined weight of component (A) and component (B), (component (C)/[component (A)+component (B)]), being from 0.001/100 to 5/100, wherein in the composite substantially all the component (B) have lengths of 2 mm or more, (A): polyolefin resin,
(B): fibers,
(C): heavy metal deactivator.

In addition, the invention also provides a molded article obtained from the above composite.

DESCRIPTION OF PREFERRED EMBODIMENTS

Component (A) in the present invention is a polyolefin resin, which is a resin produced by polymerization of polymerizable monomer mainly comprising olefin monomer. The polyolefin resin in the present invention typically include homopolymers of olefin and copolymers of two or more kinds of olefin, specific examples of which include polyethylene resin, polypropylene resin and polybutene resin. Polyethylene resin includes an ethylene homopolymer, ethylene-α-olefin copolymers, and the like. Moreover, the polyolefin resin in the present invention also includes modified polyolefin resins such as polymers obtained by modifying the above-mentioned typical polyolefin resins with monomers other than olefin and/or with polymers other than the typical polyolefin resins by graft polymerization or the like, and copolymers made up of olefin and polymerizable monomer other than olefin. Examples of the modified polyolefin resin include polymers obtained by graft-polymerization of an unsaturated carboxylic acid and/or its derivative onto an olefin homopolymer or copolymer of two or more kinds of olefin, polymers obtained by copolymerization of ethylene with an unsaturated carboxylic acid and/or its derivative, and the like.

In the present invention, component (A) may comprise a single kind of polyolefin resin or a mixture of two or more kinds of polyolefin resin. In addition, component (A) also may be a mixture of a modified polyolefin resin and a non-modified polyolefin resin. In a preferred embodiment, the polyolefin resin (A) is a modified polyolefin resin in which a part or the whole part of the polyolefin is modified with an unsaturated carboxylic acid or a derivative thereof.

Polypropylene resin as component (A) includes a propylene homopolymer, propylene-ethylene random copolymers, propylene-α-olefin random copolymers, and composite polymers obtained by first homopolymerizing propylene and then copolymerizing ethylene and propylene to form an ethylene-propylene copolymer portion, and the like. Specific examples of the α-olefin include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl- 1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene. Among these, preferred are 1-butene, 1-pentene, 1-hexene and 1-octene.

The process for producing the polypropylene resin is not particularly restricted and can be any of the processes of solution polymerization, slurry polymerization, bulk polymerization and gas phase polymerization exemplified in "New Polymer Production Process (edited by Yasuji SAEKI, KOGYO CHOSAKAI PUBLISHING CO. (1994)), JP-A-4-323207, JP-A-61-287917 and other literature. The resin can also be produced by combination of these processes. A catalyst used for the production can be various ones known in the art, preferred examples of which include a multi-site catalyst obtained by using a solid catalyst components containing titanium atom, magnesium atom and halogen atom, or a single-site catalyst obtained by using a metallocene complex, etc.

Component (B) in the present invention is fiber. The kind of the fiber in the present invention is not limited as far as it can reinforce the polyolefin resin. For example, any of glass fiber, carbon fiber, polyester fiber, metal fiber and aromatic polyamide fiber can be employed. Among these, preferred is glass fiber. A binder used for binding fibers is not limited and examples thereof include polypropylene resin, polyurethane resin, polyester resin, acrylic resin, epoxy-based resin, starch, vegetable oil, or the like. The binder can further be incorporated with acid-modified polypropylene resin, a surface treating agent, and a lubricant, such as paraffin wax.

In the present invention, to improve wettability, adhesiveness and the like, the fiber may be treated with a surface treating agent before its compounding. Examples of the surface treating agent includes those of silane-type coupling agents, titanate-type coupling agents, aluminum-containing coupling agents, chromium-containing coupling agents, zirconium-containing coupling agents and borane-containing coupling agents. Among these, silane-type coupling agents and titanate-type coupling agents are preferred. In particular, silane-type coupling agents are suitable. Examples of preferable silane-type coupling agents include triethoxysilane, vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane. Among these, suitable are aminosilanes such as γ-aminopropyltriethoxysilane and N-β-(aminoethyl)-γ-aminopropyltrimethoxysilane. The method for treating the fiber with the surface treating agent is not particularly limited and any method conventionally employed, for example, the aqueous solution method, the organic solvent method and the spray method, can be employed.

Component (C), namely a heavy metal deactivator, used in the present invention is a compound which is capable of causing a metal ion to chelate and which exhibits an activity of preventing a macromolecular material from deterioration caused by metal-promoted thermal oxidation under circumstances where the macromolecular material comes into or is kept in contact with metal. Heavy metal deactivators known in the art can be used as component (C). Examples thereof include derivatives of benzotriazole, compounds having at least one group represented by —CO—NH— (for example, derivatives of oxalic acid, salicylic acid, hydrazide, and hydroxybenzoic acid anilide) and sulfur-containing phosphites, which are disclosed in "New Development of High Molecule Additives" pages 76–78 published by The Nikkan Kogyo Shimbun and JP-A-8-302331.

Among these, preferred are benzotriazole, 2,4,6-triamino-1,3,5-triazine, 3,9-bis[2-(3,5-diamino-2,4,6-triazaphenyl)ethyl]-2,4,8,10-tetraoxaspiro[5.5]undecane, ethylenediamine-tetraacetic acid, alkali metal (Li, Na, K) salts of ethylenediamine-tetraacetic acid, N,N'-disalicylidene-ethylenediamine, N,N'-disalicylidene-1,2-propylenediamine, N,N"-disalicylidene-N'-methyl-dipropylenetriamine, 3-(N-salicyloyl)amino-1,2,4-triazole, decamethylenedicarboxylic acid-bis (N'-salicyloyl hydrazide), nickel-bis(1-phenyl-3-methyl-4-decanoyl-5-pyrazolate), 2-ethoxy-2'-ethyloxanilide, 5-tert-butyl-2-ethoxy-2'-ethyloxanilide, N,N-diethyl-N',N'-diphenyloxamide, N,N'-diethyl-N,N'-diphenyloxamide, oxalic acid-bis(benzylidenehydrazide), thiodipropionic acid-bis(benzylidenehydrazide), isophthalic acid-bis(2-phenoxypropionylhydrazide), bis(salicyloylhydrazine), N-salicylidene-N'-salicyloylhydrazone, 2',3-bis[[3-[3,5-di-tert-butyl-4-hydroxyphenyl]propionyl]]p ropionohydrazide, tris[2-tert-butyl-4-thio(2'-methyl-4'-hydroxy-5'-tert-butyl)phenyl-5-methyl]-phenylphosphite, bis[2-tert-butyl-4-thio(2'-methyl-4'-hydroxy-5'-tert-butylp henyl)-5-methylphenyl]-pentaerythritol-diphosphite, tetrakis[2-tert-butyl-4-thio(2'-methyl-4'-hydroxy-5'-tert-b utylphenyl)-5-methylphenyl]-1,6-hexamethylene-bis(N-hydroxy ethyl-N-methylsemicarbazide)-diphosphite, tetrakis[2-tert-butyl-4-thio(2'-methyl-4'-hydroxy-5'-tert-b utylphenyl)-5-methylphenyl]-1,10-decamethylene-di-carboxyli c acid-di-hydroxyethylcarbonyl hydrazide-diphosphite, tetrakis[2-tert-butyl-4-thio(2'-methyl-4'-hydroxy-5'-tert-b utylphenyl)-5-methylphenyl]-1,10-decamethylene-di-carboxyli c acid-di-salicyloyl hydrazide-diphosphite, tetrakis[2-tert-butyl-4-thio(2'-methyl-4'-hydroxy-5'-tert-b utylphenyl)-5-methylphenyl]-di(hydroxyethylcarbonyl) hydrazide-diphosphite, tetrakis[2-tert-butyl-4-thio(2'-methyl-4'-hydroxy-5'-tert-b utylphenyl)-5-methylphenyl]-N,N'-bis(hydroxyethyl)oxamide-d iphosphite, 2,2'-oxamide bis[ethyl 3-(3,5-tert-butyl-4-hydroxyphenyl)propionate].

Particularly preferable is at least one kind of compound selected from compounds having at least one group represented by —CO—NH— (e.g., oxalic derivatives, salicylic derivatives, and hydrazide derivatives) and sulfur-containing phosphites. More preferable are compounds 1 to 6 shown below. These individual heavy metal deactivators may, of course, be used alone. Moreover, two or more kinds of heavy metal deactivators may be used together.

(Compound 1) Adekastab CDA-1, CDA-1M mfd. by Asahi Denka Co., Ltd.: 3-(N-Salicyloyl)amino-1,2,4-triazole

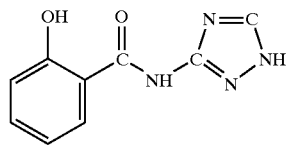

(Compound 2) Adekastab CDA-6 mfd. by Asahi Denka Co., Ltd.: Decamethylene dicarboxylic acid-bis(N'-salicyloylhydrazide)

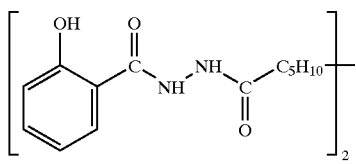

(Compound 3) Inhibitor OABH mfd. by Eastman Chemical Co.: Oxalylic acid-bis[benzylidenehydrazide]

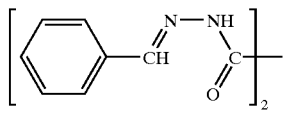

(Compound 4) Irganox MD1024: 2',3-Bis[[3-[3,5-di-tert-butyl-4-hydroxyphenyl]propionyl]]

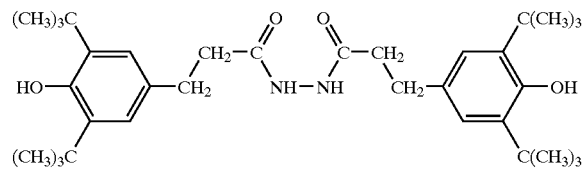

(Compound 5) Nauguard XL-1 mfd. by SHIRAISHI CALCIUM KAISHA, LTD.: 2,2'-Oxamidbis[ethyl 3-(3,5-tert-butyl-4-hydroxyphenyl]propionate]

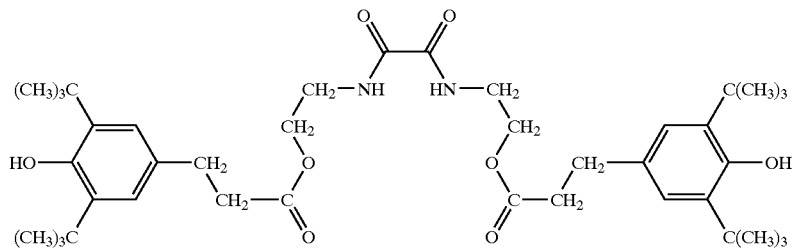

(Compound 6) Hostanox OSP-1: Tris[2-tert-butyl-4-thio(2'-methyl-4'-hydroxy-5'-tert-butyl )phenyl-5-methyl]-phenylphosphite

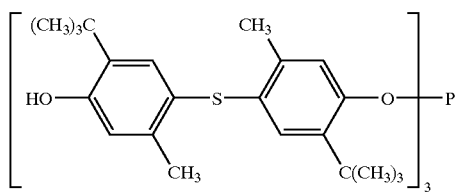

The "modified polyolefin resin" in this invention includes a resin obtained by graft-polymerizing an unsaturated carboxylic acid and/or its derivative onto an olefin homopolymer or copolymer of two or more kinds of olefins, and a resin obtained by copolymerizing one or more kinds of olefin with an unsaturated carboxylic acid and/or its derivative.

The unsaturated carboxylic acid used for the above-mentioned modification can be, for example, maleic acid, fumaric acid, itaconic acid, acrylic acid and methacrylic acid. The derivatives of the unsaturated carboxylic acids can be, for example, acid anhydrides, esters, amides, imides and metal salts of the acids. Specific examples thereof include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate, dimethyl fumarate, acrylamide, methacrylamide, maleic acid monoamide, maleic acid diamide, fumaric acid monoamide, maleimide, N-butylmaleimide and sodium methacrylate. Further, there can be used acids, such as citric acid and malic acid, which form unsaturated carboxylic acids by undergoing dehydration in the step of being grafted to polyolefin. Preferred of these unsaturated carboxylic acids and the derivatives thereof are glycidyl esters of acrylic acid and methacrylic acid, and maleic anhydride. Examples of the modified polyolefin resin resulting from such modification include one which obtained by modifying a polyolefin resin comprising ethylene and/or propylene as a main polymer-constituting unit by graft-polymerizing maleic anhydride onto the polyolefin resin and one obtained by copolymerizing olefin mainly comprising ethylene and/or propylene with glycidyl methacrylate or maleic anhydride. The modified polypropylene resins used in this invention are preferably those in which 0.1–10% by weight of the polymer-constituting units are derived from the above-mentioned unsaturated carboxylic acids or the derivatives thereof. Particularly, when these components are introduced into the polymer chain through random copolymerization or block copolymerization, the above-mentioned percentage is preferably 3–10% by weight, and when they are introduced through graft polymerization it is preferably 0.1–10% by weight. When the content of the unsaturated carboxylic acid or its derivative is too low, some mechanical strength, such as impact strength and fatigue characteristic, of a molded article obtained from the fiber-reinforced polyolefin resin composite may be low. On the other hand, when it is too high, some mechanical strength, as rigidity, of a molded article may be low.

The ratio of the weight of component (A) to the weight of component (B), (component (A)/component (B)), in this invention is from 20/80 to 95/5, preferably from 25/75 to 90/10, more preferably from 30/70 to 80/20. When the proportion of the component (B) is too small, a sufficient reinforcing effect on mechanical strength such as rigidity and impact strength cannot be obtained. On the other hand, when the proportion of the component (B) is too large, preparation of a fiber-reinforced polyolefin resin composite and production of a molded article from the composite tend to be difficult.

The ratio of the weight of component (C) to the combined weight of component (A) and component (B), (component (C)/[component (A)+component (B)]), in this invention is from 0.001/100 to 5/100, preferably from 0.01/100 to 2/100, more preferably 0.05/100 to 1/100. When the amount of the component (C) is too small, the durability of the resulting fiber-reinforced polyolefin resin composite under circumstances of contact with metal tends to be low. On the other hand, when the amount of the component (C) is too large, troubles such as die contamination tend to occur at the time of molding.

In the fiber-reinforced polyolefin resin composite of the present invention, it is preferable that substantially all component (B) have lengths of 2 mm or more. In particular, for obtaining a molded article containing therein fibers having a weight average fiber length of 1 mm or more without damaging injection moldability when subjecting the resin composite to injection molding, it is preferable that the resin composite be in the form of pellets having a length of from 2 to 50 mm and the fibers contained therein be arranged with a length substantially equal to that of the pellets. When the fiber length is too short, a molded article obtained from a fiber-reinforced polyolefin resin composite can not be expected to have a sufficient mechanical strength such as rigidity and impact strength. On the other hand, when the fiber length is too long, production of a molded article using the resin composite may be greatly difficult.

The fiber-reinforced polyolefin resin composite of the present invention and a molded article obtained from the resin composite may contain rubber, a nucleating agent or crystallization accelerator in an appropriate amount, as required. Moreover, various kinds of additives such as antioxidants, heat stabilizers, lactone type stabilizers (e.g., 5,7-di-t-butyl-3-(3,4-dimethylphenyl)-3H-benzofuran-2-one), neutralizing agents, ultraviolet absorbers, hindered amine type light stabilizers, foam inhibitors, flame retarders, flame retarding aids, dispersing agents, antistatic agents, lubricants, antiblocking agents, e.g. silica, colorants, e.g. dyestuffs and pigments, and plasticizers may, as needed, be contained in an appropriate amount. Furthermore, tabular or granular inorganic compounds such as glass flakes, mica, glass powder, glass beads, talc, clay, alumina, carbon black and wollastonite, or whiskers may be contained in an appropriate amount, as required.

In particular, the fiber-reinforced polyolefin resin composite of the present invention and a molded article obtained from the resin composite preferably contain an antioxidant. When the resin composite or a molded article resulting from the resin composite contains an antioxidant together with a heavy metal deactivator, deterioration of the resin composite or molded article caused by metal-promoted thermal oxidation can be inhibited very effectively. Preferable antioxidants include phenol type antioxidants, phosphorus-containing antioxidants, and sulfur-containing antioxidants. Two or more kinds of them may be used together.

Examples of the phenol-type antioxidants include compounds mentioned below. Hindered phenol-type antioxidants or semihindered phenol-type antioxidants are exemplified by 2,6-di-tert-butyl-4-methylphenol, tetrakis[methylene-3(3',5'-di-tert-butyl-4-hydroxyphenyl)propionate]methane, octadecyl-3-(3,5-di-tert-butyl-4-hydroxyphenyl) propionate, 3,9-bis[2-{3-(3-tert-butyl-4-hydroxy-5-methylphenyl)-propio nyloxy}-1,1-dimethylethyl]-2,4,8,10-tetraoxaspiro-[5. 5]undecane, 1,3,5-tris2[3(3,5-di-tert-butyl-4-hydroxyphenyl)propionyloxy]ethylisocyanate, 1,3,5-trimethyl-2,4,6-tris(3,5-di-tert-butyl-4-hydroxybenzy l)benzene, tris(3,5-di-tert-butyl-4-hydroxybenzyl) isocyanurate, 1,3,5-tris(4-tert-butyl-3-hydroxy-2,6-dimethylbenzyl) isocyanurate, pentaerythrityl-tetrakis[3-(3,5-di-tert-butyl-4-hydroxyphen yl) propionate], triethylene glycol-N-bis-3-(3-tert-butyl-5-methyl-4-hydroxyphenyl) propionate, 1,6-hexane diol bis[3-(3,5-di-tert-butyl-4-hydroxyphenyl) propionate], 2,2-thiobis-diethylenebis[3-(3,5-di-tert-butyl-4-hydroxyphenyl) propionate], 2,2'-methylene-bis-(4-methyl-6-tert-butylphenol), 2,2'-methylene-bis-(4-ethyl-6-tert-butylphenol), 2,2'-methylene-bis-(4,6-di-tert-butylphenol), 2,2'-ethylidene-bis-(4,6-di-tert-butylphenol)(CHEMINOX 1129), 2,2'-butylidene-bis-(4-methyl-6-tert-butylphenol), 4,4'-butylidenebis(3-methyl-6-tert-butylphenol), 2-tert-butyl-6-(3-tert-butyl-2-hydroxy-5-methylbenzyl)-4-methylphenyl acrylate, 2,4-di-tert-amyl-6-(1-(3,5-di-tert-amyl-2-hydroxyphenyl)eth yl)phenyl acrylate and tocopherols.

Examples of the phosphorus-containing antioxidants include the following compounds: tris (nonylphenyl) phosphite, tris(2,4-di-tert-butylphenyl) phosphite, distearyl pentaerythritol diphosphite, bis(2,4-di-tert-butylphenyl) pentaerythritol diphosphite, bis(2,4-di-tert-butyl-6-methylphenyl) pentaerythritol diphosphite, bis(2,6-di-tert-butyl-4-methylphenyl) pentaerythritol diphosphite, bis(2,4-dicumylphenyl) pentaerythritol diphosphite, tetrakis(2,4-di-tert-butylphenyl)-4,4'-diphenylene diphosphonite, 2,2'-methylene bis(4,6-di-tert-butylphenyl) 2-ethylhexylphosphite, 2,2'-ethylidene bis(4,6-di-tert-butylphenyl) fluorophosphite, bis(2,4-di-tert-butyl-6-methylphenyl) ethylphosphite, 2-(2,4,6-tri-tert-butylphenyl)-5-ethyl-5-butyl-1,3,2-oxapho sphorinane, 2,2',2"-nitrilo[triethyl-tris(3,3',5,5'-tetra-tert-butyl-1 ,1'-biphenyl-2,2'-diyl) phosphite, and 2,4,8,10-tetra-tert-butyl-6-[3-(3-methyl-4-hydroxy-5-tert-b utylphenyl)propoxy]dibenzo[d,f][1,3,2]dioxaphosphepin.

Examples of the sulfur-containing antioxidants include the following compounds: dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentane-tetrayl tetrakis (3-laurylthiopropionate), and bis [2-methyl-4-(3-n-alkyl ($C_{12-14}$)thiopropionyloxy)-5-tert-bu tylphenyl]sulfide.

The lactone-type compounds include 5,7-di-t-butyl-3-(3,4-dimethylphenyl)-3H-benzofuran-2-one.

In the production of such fiber-reinforced polyolefin resin composites, a pultrusion process can be used in this invention. The pultrusion process is basically a method comprising drawing a continuous fiber bundle and simultaneously impregnating it with resin. For example, known are a method in which resin impregnation is performed by passing a fiber bundle through an impregnation bath containing an emulsion, suspension or solution of resin, a method in which impregnation is performed in such a manner that resin is attached to a fiber bundle by spraying a powder of the resin to the fiber bundle or passing the fiber bundle through a bath containing the resin powder and then the resin is melted, and a method in which impregnation is performed by passing a fiber bundle in a crosshead and simultaneously supplying a resin from an extruder or the like to the crosshead. Any of such known pultrusion methods may be used in this invention. Particularly preferred is a method which uses a crosshead illustrated in JP-A-3-272830 and other literature. Although, in pultrusion processes, it is typical to carry out the operation of resin impregnation in a single step, it is also possible to perform this operation in two or more separate steps.

The fiber-reinforced polyolefin resin composite of the present invention obtained in such a manner described above is not limited in shape. Arbitrary forms, for example, strand-like form, sheet-like form, tabular form and pellet-like form resulting from cutting a strand into a proper length are available. A resin composite to be applied for injection molding is preferably in a form of pellets having a length of from 2 to 50 mm.

The fiber-reinforced polyolefin resin composite can be processed into a molded article, for example, by a process comprising the following steps:

melt-kneading the fiber-reinforced polyolefin resin composite according to claim 1 to form a molten polyolefin resin composition, feeding the molten polyolefin resin composition into a cavity in a mold to shape the molten composition, and cooling the shaped polyolefin resin composition to solidify it.

To perform such a process, injection molding, press molding or the like can be employed. In view of mechanical strength of a molded article, the fibers in the molded article preferably have a weight average fiber length of not less than 1 mm. The weight average length of the fibers contained in the molded article of the present invention can be measured by a method described in JP-A-2002-5924. A molded article containing fibers whose weight average fiber length is not less than 1 mm can be obtained, for example, by using, as a raw material, a fiber-reinforced polyolefin resin composite pellet having a length of from 2 mm to 50 mm which contains fibers having a length almost equal to the length of the pellet and performing melt-kneading and molding under a condition where the fibers can be kept to have a weight average fiber length of 1 mm or more.

EXAMPLES

The present invention is illustrated below by reference to Examples, which, however, are just illustrative and do not limit the scope of the present invention.

The methods for preparation of samples for evaluation in Examples and Comparative Examples are shown below.

(1) Production of a Fiber-reinforced Polyolefin Resin Composite (Pellet)

A pellet of a fiber-reinforced polyolefin resin composite was produced by a method described in JP-A-3-121146. The impregnation temperature was 330° C. and the take-up rate was 6 m/min. The glass fibers used had a diameter of 16 μm.

The resulting pellets were injection molded under the following conditions.

Injection molding of samples for evaluation used a molding machine manufactured by The Japan Steel Works, Ltd.

Clamping force: 150 t
Screw: Screw with deep channel for long fibers
Screw diameter: 46 mm
Screw L/D: 20.3
The molding conditions are as follows:
Cylinder temperature: 250° C.
Mold temperature: 50° C.
Back pressure: 0 MPa (2) Conditions for Press Molding of Samples for Evaluation A sample molded article for evaluation (thickness: 3 mm) obtained by injection molding was subjected to hot pressing under the conditions below into a thickness of 1 mm, resulting in a sample for a heat aging resistance test (under copper plate contact).

Preliminary heating: at 230° C. for 5 minutes
Pressing: at 230° C., 4.9 MPa for 5 minutes
Cooling: at 30° C., 4.9 MPa for 5 minutes The evaluation method used in Examples and Comparative Examples is described below.

(1) Durability Test (Heat Aging Resistance Test Under Copper Plate Contact)

The sample for a heat aging resistance test (thickness: 1 mm) prepared by the method described above was punched out into a circular form with a diameter of 25 mm, which was then sandwiched between two circular plates (thickness: 1 mm) with a diameter of 15 mm and fixed so that the test piece be in contact with the cooper plates. The resultant was placed in a 160° C. gear oven, thereby being subjected to a heat aging resistance test under copper plate contact. The aging time (unit: hour) was defined as a time required for a portion of the test piece to become deteriorated and discolored, around a portion in contact with the circular copper plates. The aging time obtained in the above manner was used as a measure of durability of a formed article of a fiber-reinforced polyolefin resin composite, which is a raw material of a sample for a heat aging resistance test.

(2) Weight Average Fiber Length of Fibers in a Molded Article

The weight average length of the fibers contained in a molded article was measured by a method described in JP-A-2002-5924.

The compositions of the samples used in Examples and Comparative Examples are shown in Table 1. The additives used evaluations are shown below.

C-1: Adekastab CDA-1M mfd. by Asahi Denka Co., Ltd. [Chemical name of main ingredient: 3-(N-Salicyloyl)amino-1,2,4-triazole]

C-2: Irganox MD1024 mfd. by Ciba Specialty Chemicals [Chemical name: 2',3-Bis[[3-[3,5-di-tert-butyl-4-hydroxyphenyl]propionyl]]propionohydrazide]

C-3: Nauguard XL-1 mfd. by SHIRAISHI CALCIUM KAISHA, LTD. [Chemical name: 2,2'-Oxamidbis[ethyl 3-(3,5-tert-butyl-4-hydroxyphenyl]propionate]

(Additives)

D-1: Sumilizer GA80 mfd. by Sumitomo Chemical Co. Ltd. [Chemical name: 3,9-Bis[2-[3-(3-tert-butyl-4-hydroxy-5-methylphenyl)propionyloxy]-1,1-dimethylethyl]-2,4,8,10-tetraoxaspiro[5.5]undecane]

D-2: Sumilizer GP mfd. by Sumitomo Chemical Co. Ltd. [Chemical name: 6-[3-(3-t-Butyl-4-hydroxy-5-methyl phenyl)propoxy]-2,4,8,10-tetra-t-butyldibenz[d,f] [1,3,2] dioxaphosphepin]

D-3: HP136 mfd. by Ciba Specialty Chemicals, [Chemical name: 5,7-tert-Butyl-3-(3,4-dimethylphenyl)-3H-benzofuran-2-one]

D-4: ULTRANOX 626 mfd. by GE Specialty Chemicals [Chemical name: Bis(2,4-di-tert-butylphenyl)pentaerythritoldiphosphite]

D-5: Sumilizer TPM mfd. by Sumitomo Chemical Co. Ltd. [Chemical name: Dimyristyl 3,3'-thiodipropionate]

D-6: HA70G mfd. by Sankyo Co., Ltd. [Chemical name: Bis(2,2,6,6-tetramethyl-4-piperidyl) sebacate]

D-7: Viosorb 80 mfd. by Kyodo Chemical Co., Ltd. [Chemical name: 2,4-Di-tert-butylphenyl-3,5-di-tert-butyl-4-hydroxybenzoate]

D-8: ELEC TS-5 mfd. by Kao Corp. [Chemical name: Glycerol monostearate]

Example 1

A pellet of a fiber-reinforced polyolefin resin composite having a glass fiber content of 40% by weight and a pellet length of 9 mm was prepared in a composition shown in Table 1 in the method described in JP-A-3-121146. The polyolefin resin (A-1) used is a mixture of a polypropylene resin (E-1) and a modified polypropylene resin (F-1) [(E-1)/(F-1)=90/10 (weight ratio)]. The polypropylene resin (E-1) is a propylene homopolymer (MFR=25). The modified polyolefin resin (F-1) is a maleic acid-modified polypropylene resin (MFR=40, maleic acid graft amount=0.2 wt %). Additives compounded to 100 parts by weight of [component (A)+component (B)] are shown in Table 1. The values of MFR are those measured at a temperature of 230° C. and a load of 21.18 N according to JIS K 7210.

The pellet obtained was subjected to injection molding, yielding a molded article (thickness: 3 mm). The weight average length of the fibers contained in the molded article was 4 mm. The molded article was reformed by hot pressing, yielding a sheet (thickness: 1 mm) for evaluation. Using this sheet, heat aging resistance (under copper plate contact) was evaluated. The result is shown in Table 1.

Example 2

Preparation of a sample and comparison were performed in the same manner as Example 1 except changing the compounding amount of the Adekastab CDA-1M [C-1] to 0.25 parts by weight as shown in Table 1. The result is shown in Table 1.

Example 3

Preparation of a sample and comparison were performed in the same manner as Example 1 except changing the Adekastab CDA-1M [C-1] to 0.45 parts by weight of Irganox MD1024 [C-2] as shown in Table 1. The result is shown in Table 1.

Example 4

Preparation of a sample and comparison were performed in the same manner as Example 1 except compounding no [D-2] and no [D-3] and changing the amount of Ultranox 626 [D-4] to 0.1 parts by weight as shown in Table 1. The result is shown in Table 1.

Comparative Example 1

Preparation of a sample and comparison were performed in the same manner as Example 1 except compounding no heavy metal deactivator [C-1] as shown in Table 2. The result is shown in Table 2.

Comparative Example 2

Preparation of a sample and comparison were performed in the same manner as Example 1 except compounding no heavy metal deactivator [C-1] and no antioxidant [D-1] as shown in Table 2. The result is shown in Table 2.

Example 5

A pellet of a fiber-reinforced polyolefin resin composite having a glass fiber content of 40% by weight and a pellet length of 9 mm was prepared in a composition shown in Table 1 in the method described in JP, 3-121146,A. The polyolefin resin (A-2) used is a mixture of a polypropylene resin (E-2) and a modified polypropylene resin (F-1) [(E-2)/(F-1)=90/10 (weight ratio)]. The polypropylene resin (E-2) is a propylene homopolymer (MFR=120). The modified polyolefin resin (F-1) is a maleic acid-modified polypropylene resin (MFR=40, maleic acid graft amount=0.2 wt %). Additives compounded to 100 parts by weight of [component (A)+component (B)] are shown in Table 3. The values of MFR are those measured at a temperature of 230° C. and a load of 21.18 N according to JIS K 7210.

The pellet obtained was injection molded, yielding a molded article (thickness: 3 mm). The molded article was reformed by hot pressing, yielding a sheet (thickness: 1 mm) for evaluation. Using this sheet, heat aging resistance (under copper plate contact) was evaluated. The result is shown in Table 3.

Examples 6 and 7

Preparation of a sample and comparison were performed in the same manner as Example 5 except changing the kinds and compounding amounts of the additives used as shown in Table 3. The results are shown in Table 3.

Comparative Example 3

Preparation of a sample and comparison were performed in the same manner as Example 5 except compounding no heavy metal deactivator as shown in Table 3. The result is shown in Table 3.

TABLE 1

| Composition (part by weight) | Example 1 | Example 2 | Example 3 | Example 4 |
|---|---|---|---|---|
| (A) Polyolefin resin | | | | |
| Resin species | A-1 | A-1 | A-1 | A-1 |
| Amount | 60 | 60 | 60 | 60 |
| (B) Fiber | | | | |
| Fiber species | B-1 | B-1 | B-1 | B-1 |
| Amount | 40 | 40 | 40 | 40 |
| (C) Metal deactivator | | | | |
| Compound | C-1 | C-1 | C-2 | C-1 |
| Amount | 0.45 | 0.25 | 0.45 | 0.45 |
| (D) Additive | | | | |
| Compound | D-1 | D-1 | D-1 | D-1 |
| Amount | 0.2 | 0.2 | 0.2 | 0.2 |
| Compound | D-2 | D-2 | D-2 | Not added |
| Amount | 0.1 | 0.1 | 0.1 | |
| Compound | D-3 | D-3 | D-3 | Not added |
| Amount | 0.1 | 0.1 | 0.1 | |
| Compound | Not added | Not added | Not added | D-4 |
| Amount | | | | 0.1 |
| Compound | D-5 | D-5 | D-5 | D-5 |
| Amount | 0.5 | 0.5 | 0.5 | 0.5 |
| Compound | D-6 | D-6 | D-6 | D-6 |
| Amount | 0.05 | 0.05 | 0.05 | 0.05 |
| Compound | D-7 | D-7 | D-7 | D-7 |
| Amount | 0.05 | 0.05 | 0.05 | 0.05 |
| Compound | D-8 | D-8 | D-8 | D-8 |
| Amount | 0.05 | 0.05 | 0.05 | 0.05 |
| Weight average fiber length in molded article (mm) | 4 | 4 | 4 | 4 |
| Results of evaluation Aging time (under contact with metal) (hour) | 260 | 240 | 380 | 360 |

TABLE 2

| Composition (part by weight) | Comparative Example 1 | Comparative Example 2 |
|---|---|---|
| (A) Polyolefin resin | | |
| Resin species | A-1 | A-1 |
| Amount | 60 | 60 |
| (B) Fiber | | |
| Fiber species | B-1 | B-1 |
| Amount | 40 | 40 |

TABLE 2-continued

| Composition (part by weight) | Comparative Example 1 | Comparative Example 2 |
|---|---|---|
| (C) Metal deactivator | | |
| Compound | Not added | Not added |
| Amount | | |
| (D) Additive | | |
| Compound | D-1 | Not added |
| Amount | 0.2 | |
| Compound | D-2 | D-2 |
| Amount | 0.1 | 0.1 |
| Compound | D-3 | D-3 |
| Amount | 0.1 | 0.1 |
| Compound | D-5 | D-5 |
| Amount | 0.5 | 0.5 |
| Compound | D-6 | D-6 |
| Amount | 0.05 | 0.05 |
| Compound | D-7 | D-7 |
| Amount | 0.05 | 0.05 |
| Compound | D-8 | D-8 |
| Amount | 0.05 | 0.05 |
| Weight average fiber length in molded article (mm) | 4 | 4 |
| Results of evaluation Aging time (under contact with metal) (hour) | 120 | 70 |

TABLE 3

| Composition (part by weight) | Example 5 | Example 6 | Example 7 | Comparative Example 3 |
|---|---|---|---|---|
| (A) Polyolefin resin | | | | |
| Resin species | A-1 | A-1 | A-1 | A-1 |
| Amount | 60 | 60 | 60 | 60 |
| (B) Fiber | | | | |
| Fiber species | B-1 | B-1 | B-1 | B-1 |
| Amount | 40 | 40 | 40 | 40 |
| (C) Metal deactivator | | | | |
| Compound | C-1 | C-2 | C-3 | Not added |
| Amount | 0.2 | 0.2 | 0.2 | |
| (D) Additive | | | | |
| Compound | D-1 | D-1 | D-1 | D-1 |
| Amount | 0.1 | 0.1 | 0.1 | 0.1 |
| Compound | D-4 | D-4 | D-4 | D-4 |
| Amount | 0.1 | 0.1 | 0.1 | 0.1 |
| Compound | D-5 | D-5 | D-5 | D-5 |
| Amount | 0.3 | 0.3 | 0.3 | 0.3 |
| Weight average fiber length in molded article (mm) | 4 | 4 | 4 | 4 |
| Results of evaluation Aging time (under contact with metal) (hour) | 240 | 310 | 290 | 190 |

As described in detail above, according to the present invention, it is possible to obtain a fiber-reinforced polyolefin resin composite having an improved durability under circumstances of contact with metal and a molded article from the resin composite.

What is disclosed is:

1. A fiber-reinforced polyolefin resin composite comprising the following components (A), (B) and (C), the ratio of the weight of component (A) to the weight of component (B), (component (A)/component (B)), being from 20/80 to 95/5, the ratio of the weight of component (C) to the combined weight of component (A) and component (B), (component (C)/[component (A)+component (B)]), being from 0.001/100 to 5/100, wherein in the composite substantially all the component (B) have lengths of 2 mm or more, (A): polyolefin resin, (B): fibers, (C): heavy metal deactivator.

2. The fiber-reinforced polyolefin resin composite according to claim 1, wherein the heavy metal deactivator (C) is at least one compound selected from compounds having at least one group represented by —CO—NH— and sulfur-containing phosphites.

3. The fiber-reinforced polyolefin resin composite according to claim 1, wherein the polyolefin resin (A) is a modified polyolefin resin in which a part or the whole part of the polyolefin is modified with an unsaturated carboxylic acid or a derivative thereof.

4. The fiber-reinforced polyolefin resin composite according to claim 1, wherein the polyolefin resin (A) is a polypropylene resin.

5. The fiber-reinforced polyolefin resin composite according to claim 1, wherein the composite is obtained by pultrusion process.

6. The fiber-reinforced polyolefin resin composite according to claim 1, wherein the composite is in the form of pellets.

7. A molded article obtained by a process comprising the steps of:

melt-kneading the fiber-reinforced polyolefin resin composite according to claim 1 to form a molten polyolefin resin composition, feeding the molten polyolefin resin composition into a cavity in a mold to shape the molten composition, and cooling the shaped polyolefin resin composition to solidify it, wherein the fibers contained in the molded article have a weight average fiber length of 1 mm or more.

* * * * *